Feb. 27, 1968  J. J. FESCO  3,370,405
VACUUM CLEANER FILTER BAGS AND METHOD OF MANUFACTURING SAME
Filed Dec. 18, 1964  2 Sheets-Sheet 1
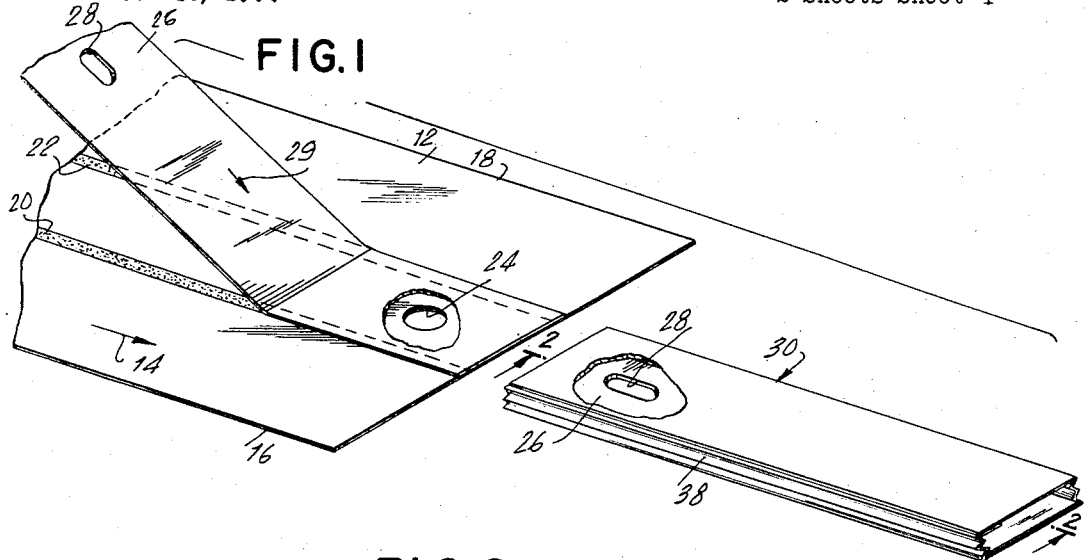
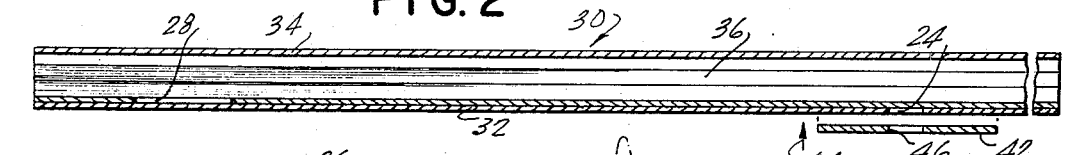
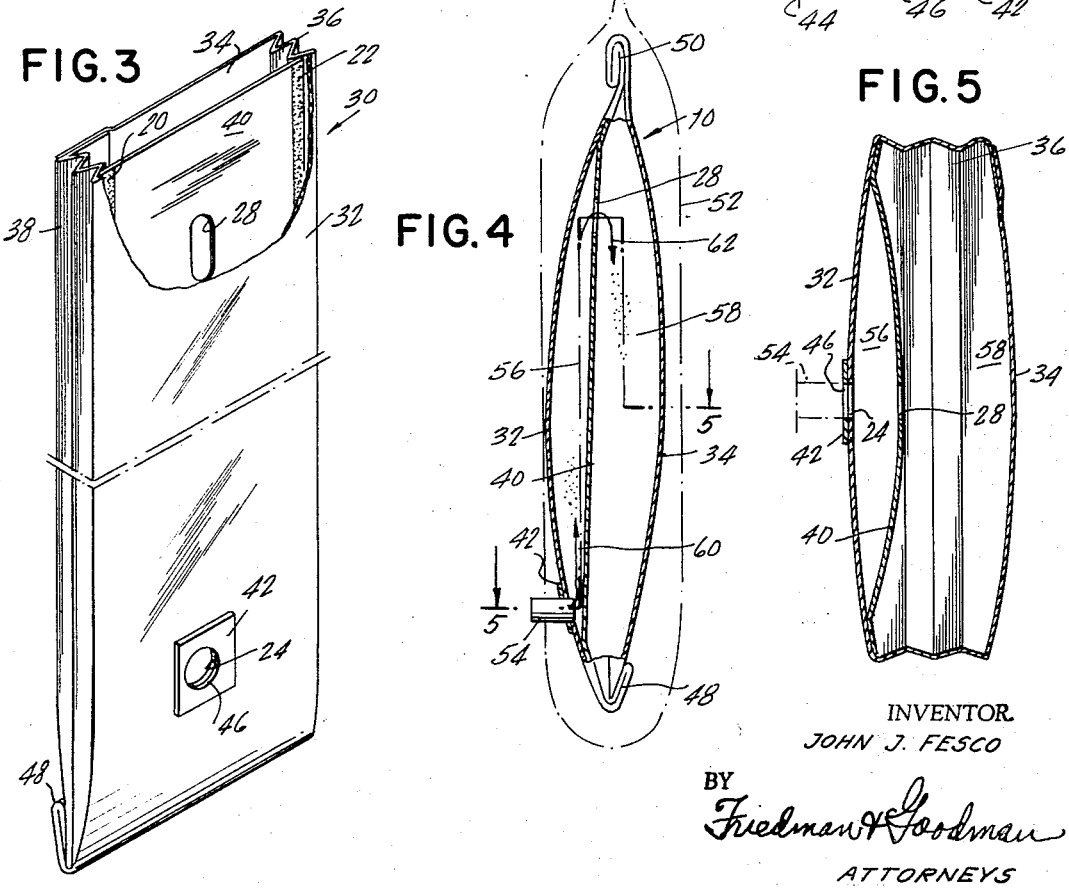
INVENTOR.
JOHN J. FESCO
BY
Friedman & Goodman
ATTORNEYS Feb. 27, 1968  J. J. FESCO  3,370,405
VACUUM CLEANER FILTER BAGS AND METHOD OF MANUFACTURING SAME
Filed Dec. 18, 1964  2 Sheets-Sheet 2
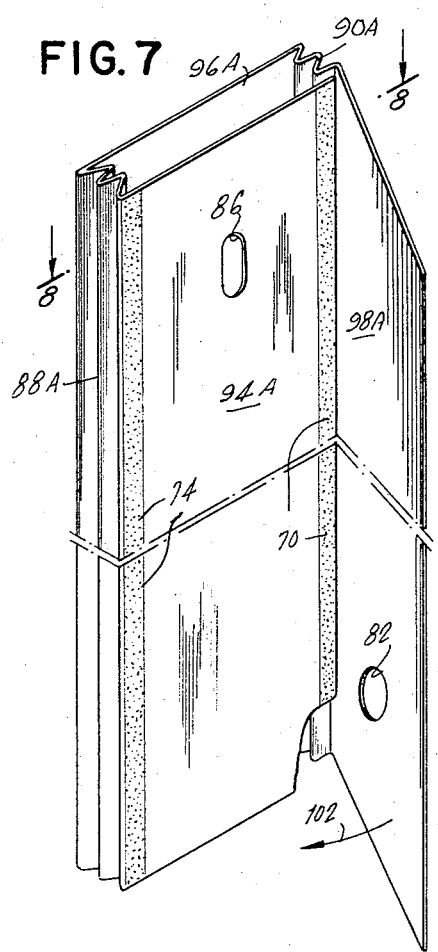
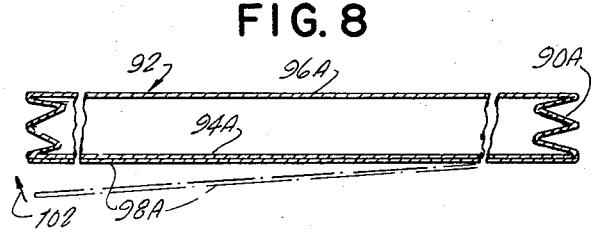
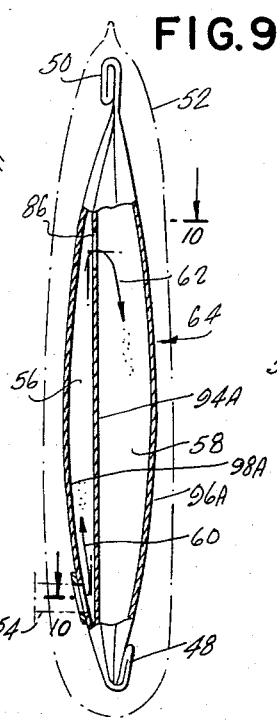
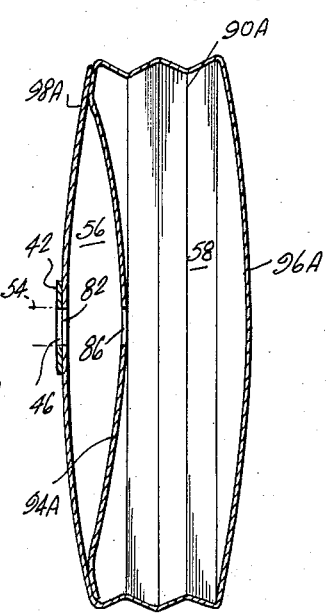
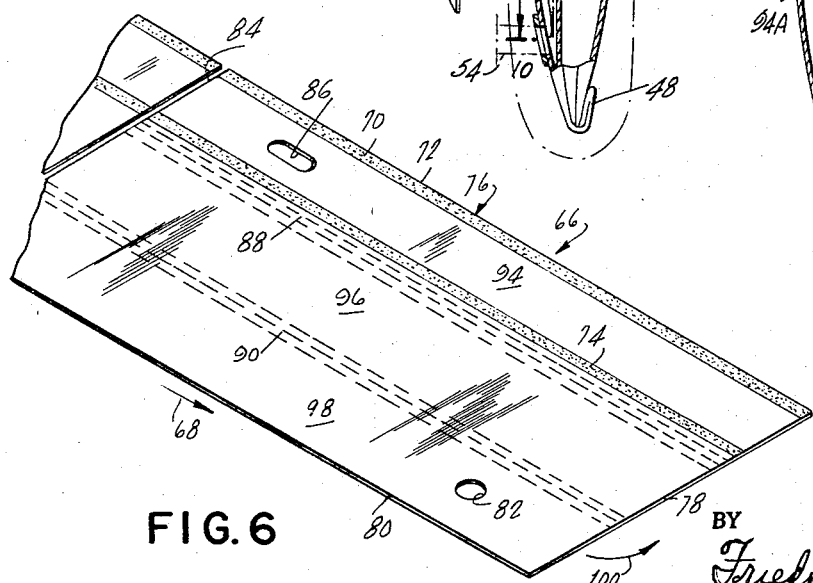
INVENTOR.
JOHN J. FESCO
BY
Friedman & Goodman
ATTORNEYS

United States Patent Office 3,370,405
Patented Feb. 27, 1968

3,370,405
VACUUM CLEANER FILTER BAGS AND METHOD OF MANUFACTURING SAME
John J. Fesco, Baldwin, N.Y., assignor to Studley Paper Company, Inc., a corporation of New York
Filed Dec. 18, 1964, Ser. No. 419,304
5 Claims. (Cl. 55—368)

The present invention relates to a vacuum cleaner filter bag.

Vacuum cleaner filter bags are usually made of paper filter sheet material through which the air drawn by suction into the vacuum cleaner is free to pass, the particles of dust contained within the air being retained within the filter bag. However, it has been found that relatively small or fine particles of dust tend to pass through the wall of the filter bag at the point of impact with the filter bag wall opposite the point at which the dust laden air enters the filter bag.

In view of the foregoing, it is an object of the present invention to provide a filter bag which will prevent the passage through the walls thereof of relatively fine particles of dust.

In accordance with the foregoing object of the present invention, it is another object of the present invention to provide a highly novel filter bag having a double wall which functions to prevent the escape of the fine particle dust through the wall of the filter bag at the point of impact of the dust upon the wall.

It is another object of the present invention to provide a relatively simple method for making a vacuum cleaner filter bag which is particularly useful in connection with an upright vacuum cleaner.

It is a further object of the present invention to provide a relatively simple and efficient method for making a double wall vacuum cleaner filter bag.

Other and further objects and advantages of the present invention will become readily apparent to one skilled in the art from a consideration of the following specification taken in connection with the appended drawings.

In the drawings which illustrate the best modes presently contemplated for carrying out the invention:

FIGURE 1 is a perspective view which illustrates the formation of a double wall vacuum cleaner filter bag pursuant to the present invention;

FIGURE 2 is a sectional view on an enlarged scale taken on the line 2—2 of FIGURE 1;

FIGURE 3 is an elevational view which illustrates an intermediate stage in the manufacture of a vacuum cleaner filter bag pursuant to the present invention, with portions broken away for purposes of illustration;

FIGURE 4 is a view in elevation and partially in section of a vacuum cleaner filter bag pursuant to the present invention, the bag being mounted within an upright vacuum cleaner;

FIGURE 5 is a sectional view on an enlarged scale taken on the line 5—5 of FIGURE 4;

FIGURE 6 is a view which illustrates the manufacture of a modified form of vacuum cleaner filter bag pursuant to the present invention;

FIGURE 7 is a view in elevation and illustrates an intermediate step in the formation of the modified vacuum cleaner filter bag;

FIGURE 8 is a sectional view on an enlarged scale taken on the line 8—8 of FIGURE 7;

FIGURE 9 is a view similar to FIGURE 4 and illustrates the modified form of vacuum cleaner filter bag; and FIGURE 10 is a sectional view of an enlarged scale taken on the line 10—10 of FIGURE 9.

Referring now to FIGURES 1 through 5 in detail, FIGURE 1 illustrates the method of forming a vacuum cleaner filter bag 10 pursuant to the present invention. As here shown, filter paper sheet material 12 is advanced by conventional paper bag making machinery in the direction of the arrow 14 from a supply thereof, not illustrated. The sheet material 12 is in the form of an elongated strip which is provided between the opposing longitudinal edges 16 and 18 thereof with a pair of laterally spaced stripes 20 and 22 of adhesive material, the stripes being parallel to the longitudinal edges. Apertures 24 are formed in the sheet material 12 at spaced intervals longitudinally thereof between the adhesive 20, 22. A second strip of filter paper sheet material 26, is advanced in the direction of the arrow 29 thereof from a second supply, not illustrated. It will be noted that the second sheet material strip 26 is narrower than the first sheet material strip 12 and that the second strip 26 has substantially the same widthwise dimension as the width-wise dimension between the adhesive stripes 20–22. Through the use of conventional paper bag making machinery, the second sheet material web 26 is positioned to overlie the adhesive stripes 20–22 of the first sheet material web 12 and the second web is urged into engagement with the first web so that the second web 26 is adhesively secured to the first web 12 along the adhesive stripes 20–22. Predetermined lengths of the combined sheet material webs are severed so that each length will be provided with an aperture 24 in the sheet material web 12 and a second aperture 28 defined in the second sheet material web 26 and spaced longitudinally of the combined webs from the first aperture 24. The severed portion of the combined web is then folded to form the tubular blank 30. As best shown in FIGURE 3 each elongated tubular blank is provided with a front wall 32 and a rear wall 34 which are interconnected by gussetted side walls 36 and 38. The previously mentioned inner web portion 26 defines an inner wall 40 disposed between the front wall 32 and the rear wall 34 and secured to the inner surface of the inner wall 32 along the adhesive stripes 20 and 22. Adjacent the lower end thereof the front wall 32 is provided with the previously mentioned aperture 24, an apertured collar 42 being provided on the outer surface of the front wall 32 in registry with said aperture 24. The inner wall 40 is provided with the previously mentioned aperture 28 which is positioned longitudinally upwardly from the aperture 24. In order to complete the formation of the vacuum cleaner filter bag 10 the tubular blank or form 30 is folded over upon itself at the lower end thereof below the aperture 24 to define or provide the adhesively secured bottom end closure 48. Similarly, the upper end of the tubular blank or member 30 is also folded over upon itself to provide the upper end adhesively secured closure 50. It will be understood that end closures 48 and 50 are formed by conventional paper bag making machinery. It will be noted that said machinery is effective also to secure the collar 42 onto the outer surface of the front wall 32 by moving the collar thereagainst, as indicated by the arrow 44, so that the aperture 46 which is defined in the collar 42 is in reigstry with the front wall aperture 24, the combination of said apertures defining an entrance opening into the bag 10.

FIGURE 4 illustrates the vacuum cleaner filter bag 10 pursuant to the present invention in position within the tank or cannister 52 of an upright vacuum cleaner.

In operation of the vacuum cleaner, the air inlet conduit 54 of the vacuum cleaner is inserted into the inlet opening of the filter bag 10 defined by the apertures 46 and 24. It will be noted that the intermediate wall 40 secured in position between the front wall 32 and the rear wall 34 defines with said walls within the bag 10 a first or front chamber 56 and a rear or second chamber 58. The dirt laden air enters the front chamber through the air inlet conduit, which is engaged in the inlet opening of the bag 10, the collar 42 serving to mount the conduit 54 in position. The dirt laden air then flows upwardly into the first chamber 56 as indicated by the arrow 60. The previously mentioned elongated aperture 28 in the intermediate wall 40 serves as a communication inlet between the front chamber 56 and the rear chamber 58. Consequently, the dust laden air flowing upwardly into the outer or first chamber passes through the inlet opening 28 as indicated by the arrow 62 and flows downwardly into the outer or second chamber 58. Without the presence of the intermediate wall 40, the dust laden air would have blown directly from the combined entrance openings 46–24 against the opposing portion of the rear wall 34 so that relatively fine particles of dust would be blown through the rear wall. However, the utilization of the inner wall 40 prevents the impact of the dust laden air, at a point opposite the entrance opening into the bag, the air being diverted upwardly into the chamber 56 as indicated by the arrow 60 and then downwardly into the chamber 58 as indicated by the arrow 62. The impact of the air is broken by the interposition of the inner wall 40 and in the event that any of the dust particles do pass through the inner wall 40 opposite the conduit 54, said particles would merely fall into the outer chamber 58 and not pass through the outer wall 34 in view of the fact that the impact force is broken or greatly reduced by the presence of the intermediate wall 40 opposite the entrance opening into the bag.

Referring now to FIGURES 6 through 10 in detail, there is illustrated a modified form of bag 64 pursuant to the present invention. In forming the bag 64 a continuous elongated web 66 of filter paper sheet material is withdrawn in the direction of the arrow 68 from a supply thereof, not illustrated. The web 66 is provided with a longitudinal stripe 70 of adhesive material along one longitudinal edge 72 thereof. A second stripe 74 of adhesive material is provided parallel to and inwardly of the first stripe 70. Predetermined lengths are cut from the web 66 to define blanks 76. Adjacent the lower edge 78 thereof each blank 76 is provided, adjacent its opposite longitudinal edge 80, with an aperture 82. In addition, adjacent its upper edge 84 each blank 76 is provided, between the adhesive stripes 70 and 74, thereof with an elongated aperture 86. Between the inner adhesive stripe 74 and the opposite longitudinal edge 80 thereof, each blank is provided with a first series of fold lines 88 and with a second series of fold lines 90. It will be understood that each of the described operations relative to the formation of the blanks 76, provided with the apertures 82 and 86 and the fold lines 88 and 90 and the adhesive stripes 70 and 74, are provided by conventional paper bag making machinery.

Each blank 76 is formed by conventional paper bag making machinery into a longitudinal bag tube 92. More specifically, it will be noted that each blank 76 is provided with an elongated panel 94 which is defined by the adhesive stripes 70 and 74, a second elongated panel 96 which is defined by the first series of fold lines 88 and the second series of fold lines 90 and by a third elongated panel 98 which is defined by the fold lines 90 and the longitudinal edge 80. Through the use of the conventional paper bag making machinery, each blank 76 is folded, as indicated by the arrows 100 and 102, so that the fold lines 88 and 90 define gussetted side or end walls 88A and 90A, the panel 96 defines a rear wall 96A and the panel 98 defines a front wall 98A which is bent over in superposed relation to an inner or intermediate wall 94A defined by the panel 94. The front or outer wall 98A is secured in confronting superposed relation to the intermediate wall 94A by means of the laterally spaced elongated adhesive stripes 70 and 74. Consequently, it will be noted that through the described folding operations and through the step of superposing and securing the outer wall 98A to the inner wall 94A, the latter walls being coextensive, there is defined the described bag tube 92 having a rear wall 96A, a front wall 98A, the gussetted side or end walls 88A and 90A, which extend between the front and rear walls, and an intermediate or inner wall 94A which is interposed between the front and rear walls. Furthermore, it will be noted that the front wall 98A is provided with the aperture 82 and that the intermediate wall 94A is provided with the aperture 86. The tubular bag element 92 is then converted into the vacuum cleaner filter bag 64 by providing the bottom end closure 48 and the upper end closure 50, as previously described. A collar 42 provided with an aperture at 46 is applied to the outer surface of the front wall 98A in the manner previously described so that the collar aperture 46 is in registry with the front wall aperture 82 to define an entrance opening into the first or outer chamber 56 which is defined by the outer wall 98A and the intermediate wall 94A. A second or inner chamber 58 is defined by the inner wall 94A and the rear wall 96A, and the aperture 86 in the intermediate wall 94A provides for air-flow communication between the first chamber 56 and the second chamber 58.

It will be understood that when the filter bag 64 is mounted in the vacuum cleaner cannister or tank 52 and the air inlet conduit 54 is connected to the inlet opening into the chamber 56 the vacuum cleaner filter bag 64 functions in the same manner as previously described in connection with the filter bag 10. More specifically, the dust laden air enters the inner chamber 56, as indicated by the arrow 60, and is prevented from impinging directly on the opposite portion of the rear wall 96A by means of the intermediate wall 94A. The dust laden air travels upwardly through the chamber 56 and then passes downwardly into the chamber 58, as indicated by the arrow 62, the air passing out through the rear wall 96A and the dust remaining in the second or outer chamber 58.

In view of the foregoing it will be apparent that there has been described a highly novel vacuum cleaner filter bag and a highly novel method for forming the same. It will be understood that various changes and modifications may be made in the construction of the bag and in the method for forming the same, without however departing from the basic inventive concept of the present invention, as set forth in the appended claims.

I claim:

1. A disposable vacuum cleaner filter bag having a front wall, a rear wall, opposing end walls between said front and rear walls, and upper and lower end closures, and an intermediate wall disposed between said front and rear walls and coextensive therewith, said intermediate wall having an air-flow aperture defined therein, and said front wall having an air inlet aperture defined therein, said front wall, said rear wall and said intermediate walls having common end closures.

2. A vacuum cleaner filter bag as in claim 1, all of said walls being integral.

3. A vacuum cleaner filter bag as in claim 1, said front, rear and end walls being integral, and said intermediate wall being a panel secured in position between said front and rear walls.

4. The method of forming a vacuum cleaner filter bag comprising forming an elongated bag tube having three superposed coextensive wall panels and a pair of opposing end panels which extend between said superposed wall panels, providing a first aperture in an outer one of said wall panels and a second aperture in the intermediate wall panel, and closing each of the opposite ends of said tube by providing common closures at the opposite ends of said three wall panels.

5. The method of forming a vacuum cleaner filter bag comprising providing an elongated blank of filter sheet material, providing a stripe of adhesive material along one elongated edge of said blank, providing a second stripe of adhesive material laterally inwardly of said first stripe and substantially parallel therewith to define a first elongated wall panel, providing a first and a second series of longitudinally extending fold lines laterally of said second stripe to define a second and a third elongated wall panel, defining a first aperture in said first panel and a second aperture in said third panel out of lateral alignment with said first aperture, folding said blank to superpose said three elongated wall panels and to form said first and second series of fold lines into opposing end walls which define an elongated tube with said wall panels, panels, securing together said first and third panels along said adhesive stripes, and closing each of the opposite ends of said tube by providing common closures at the opposite ends of said three wall panels.

References Cited

UNITED STATES PATENTS

| | | | |
|---|---|---|---|
| 1,302,886 | 5/1919 | Wagner | 55—368 |
| 1,383,615 | 7/1921 | Geier | 55—368 |
| 2,346,339 | 4/1944 | Vose | 55—368 X |
| 2,577,863 | 12/1951 | Sosnowich | 55—376 |
| 2,710,072 | 6/1955 | Brace | 55—368 X |
| 2,732,911 | 1/1956 | Gall | 55—368 |
| 2,784,800 | 3/1957 | Segesman | 55—371 |
| 2,832,433 | 4/1958 | Brace | 55—381 |
| 2,870,954 | 1/1959 | Kulesza | 220—62.5 |
| 2,995,205 | 8/1961 | Cordell. | |
| 3,003,682 | 10/1961 | Mattson | 229—62.5 |

FOREIGN PATENTS 599,651   3/1948   Great Britain.

HARRY B. THORNTON, *Primary Examiner.*

D. TALBERT, *Assistant Examiner.*